United States Patent
Yonekubo

[11] 3,718,400
[45] Feb. 27, 1973

[54] MIRROR DRUM OPTICAL SYSTEM FOR USE IN MICROSCOPIC SPECTROPHOTOMETER

[75] Inventor: Ken Yonekubo, Tokyo, Japan
[73] Assignee: Olympus Optical Company Limited, Tokyo, Japan
[22] Filed: Feb. 7, 1972
[21] Appl. No.: 224,041

[30] Foreign Application Priority Data

Feb. 6, 1971 Japan..................................46/4500

[52] U.S. Cl..................356/96, 350/19, 356/73, 356/201, 356/219
[51] Int. Cl............................G01j 3/42, G01n 21/06
[58] Field of Search..........356/74, 79, 83, 89, 96, 97, 356/201, 218, 219, 72, 73, 76; 350/12, 13, 19

[56] References Cited

UNITED STATES PATENTS 3,527,536  9/1970  Alpen.....................................356/96
3,205,767  9/1965  Weber et al............................350/19

Primary Examiner—Ronald L. Wibert
Assistant Examiner—V. P. McGraw
Attorney—Eric H. Waters et al.

[57] ABSTRACT

A mirror drum optical system for use in a microscopic spectrophotometer has a system of a lens and mirrors adapted to be inserted into and retracted from the optical path. A camera is arranged to photograph the specimen and the centering of the pinholes and reflex viewing system and photoindicator permit sequential observation and measurement by an observer.

1 Claim, 2 Drawing Figures

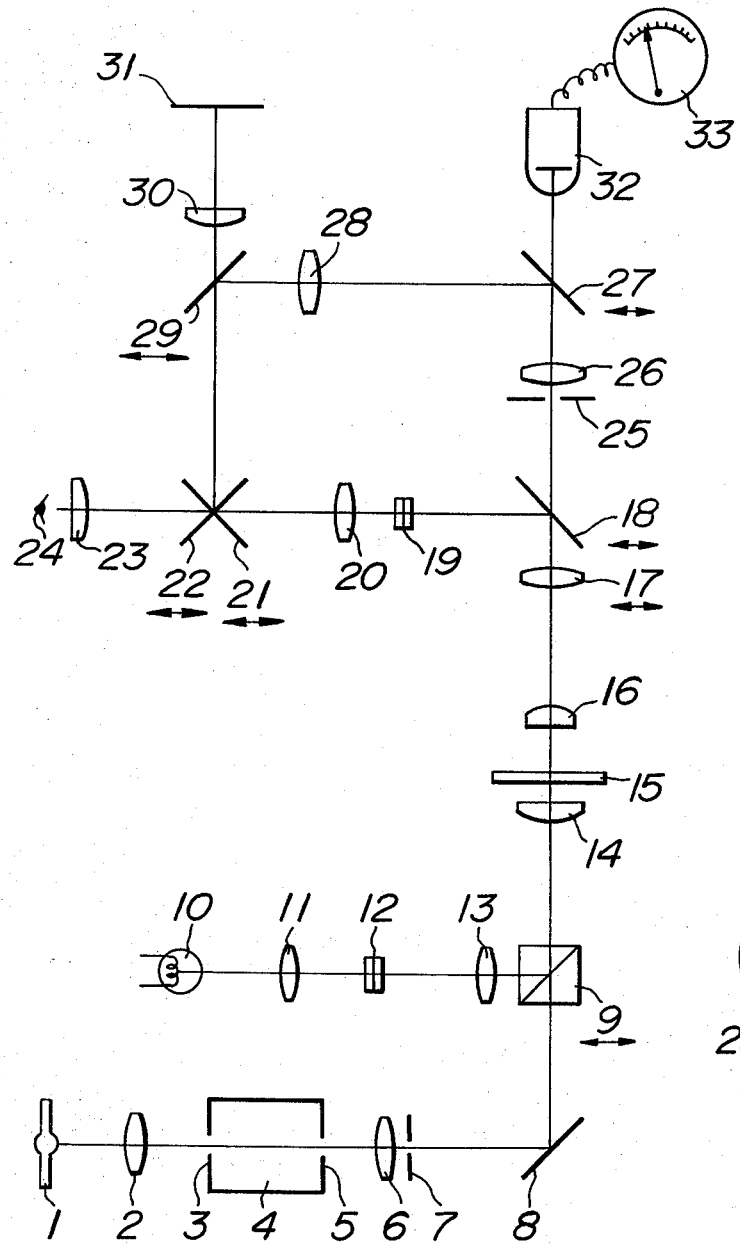
FIG_1
FIG_2

MIRROR DRUM OPTICAL SYSTEM FOR USE IN MICROSCOPIC SPECTROPHOTOMETER

This invention relates to a mirror drum optical system for use in a microscopic spectrophotometer.

Heretofore, it has been the common practice to use a microscopic spectrophotometer in case of measuring the spectrotransparency of extremely small specimens. The prior technique applied to this kind of apparatus makes use of a primary pinhole disposed on a specimen and adapted to produce a spot light by which is illuminated the portion of the specimen whose quality of light is to be measured and of a secondary pinhole disposed on the image plane given by an objective. The image of the primary pinhole is superposed upon the image of the secondary pinyole so as to effect centering of the two pinholes. This ensures considerable decrease of flare of stray light from the outside thereby improving the photometric accuracy. Thus, it is necessary to carry out centering of the two pinholes. It is also necessary to use an auxiliary illumination system which illuminates that portion of the specimen which surrounds the luminous spot illuminated by the photometric illumination system. Thus, provision must be made of an optical system for use in observing the centered condition of the two pinholes and of another optical system for use in observing the specimen. Heretofore, it has been the common practice to provide these two optical systems separately one from the other. Thus, the observer is obliged to change his attitude at each time for observing the centering and specimen in sequence, and this is troublesome in operation. Moreover, in case of using a living cellular tissue as the specimen, which could not be colored, the auxiliary illumination system must be of one which can observe the phase contrast of the specimen. However, the phase contrast microscope comprising a condenser lens, a ring iris disposed on the condenser lens, an objective and a phase plate disposed on the objective operates to interrupt the photometric luminous flux, thus rendering the photometric operation impossible. In order to avoid such disadvantage use has been made of a common objective and a common condenser lens for the photometric operation and these lenses have been replaced by a phase contrast objective and a phase contrast condenser lens, respectively. Such interchange of the lenses causes change of the sight field owing to the extremely small specimen even if the eccentricity of the lens system is made as small as possible with the result that the photometric accuracy becomes remarkably small. Even if the lens system has no eccentricity, the interchange of the objective and condenser lens at each time of effecting the photometric operation and the observing and photographing operations is very troublesome.

An object of the invention is to provide such a mirror drum optical system for use in a microscopic spectrophotometer obviating the above mentioned disadvantages of the prior technique and enabling four operations of measuring the quantity of light illuminating a specimen, observing the centering of two pinholes, observing the specimen and taking photograph to be reliably and simply obtained by means of optical systems adapted to be inserted into and retracted from the optical path and having the additional advantage that rapid and reliable operations and improvement in the photometric accuracy are possible.

Other objects will appear in the following specification, reference being had to the drawings, in which:

FIG. 1 is a diagrammatic illustration of an embodiment of a mirror drum optical system for use in a microscopic spectrophotometer according to the invention; and FIG. 2 is a plan view illustrating a manner by which a primary pinhole may be aligned with a secondary pinhole by centering.

Referring to the drawings, reference numerals 1–8 designate a photometric light source apparatus in which a luminous flux from a photometric light source 1 passes through a collector lens 2 which converges the luminous flux on an entrance slit 3 of a spectroscope 4. The spectroscope 4 serves to disperse the luminous flux to monochromatic lights and converge them on an exit slit 5 which is then forms a secondary light source. The luminous flux from the exit slit 5 passes through a slit projecting lens 6 and arrives at a primary pinhole 7 where the luminous flux is squeezed. The luminous flux is then reflected by a reflecting mirror 8 and passes through a semi-transparent prism 9 and then is converged on a focus located in front of a condenser lens 14. The semi-transparent prism 9 is adapted to be inserted into and retracted from the optical path. The image of the primary pinhole 7 is given on a specimen 15 by the instrumentality of the condenser lens 14 and this image is used as a spot illumination.

Reference numerals 10–13 designate a light source apparatus for use in detecting the phase contrast. The luminous flux from an auxiliary light source 10 passes through a collector lens 11 by which is converged the luminous flux on a ring iris 12. The luminous flux passed through the ring iris 12 falls on a relay lens 13 and then is reflected by the semi-transparent prism 9 onto a focus located in front of the condenser lens 14.

The luminous flux passed through the specimen 15 falls on an objective 16 and a phase plate projecting lens 17. The image formed at the focus located behind the objective lens 16 is reflected by a first reflecting mirror 18 and then given on a phase plate 19. The ring iris 12 and the phase plate 19 are conjugate each other. The image of the specimen 15 is given between the phase plate projecting lens 17 and the phase plate 19 and this image passes through a second relay lens 20 and an eyepiece 23 to the eye 24. If the photometric light source 1 and the auxiliary light source 10 are simultaneously energized, the eye 4 can observe the image of the specimen 15 and the image of the first pinhole 7 superposed one upon the other. Thus, during this observation of the specimen 15 the displacement of the stage, for instance, permits of obtaining on the desired position of the specimen 15 the image of the first pinhole 7.

Between the relay lens 20 and the eyepiece 23 is arranged a fourth reflecting mirror 21 adapted to be inserted into and retracted from the optical path to form the image of the specimen 15 through an eyepiece 30 on a photosensitive film 31 thereby taking a photograph of the specimen 15.

If the phase plate projecting lens 17 and the reflecting mirror 18 are retracted from the optical path, the spot image on the specimen 15, that is, the image of the primary pinhole 7 is formed on a secondary pinhole 25 by means of the objective 16. The luminous flux from the secondary pinhole 25 is impinged through a first relay lens 26, second reflecting mirror 27, third relay lens 28, third reflecting mirror 29, fifth reflecting mirror 22, and eyepiece 23 on the eye 24. Under such condition the eye 24 can sight the images of the primary pinhole 7 and of the secondary pinhole 25 superposed one upon the other and also sight the minute portion of the specimen 15 as shown in FIG. 2. The objective 16 is made adjustable in a direction perpendicular to the optical axis to perform the centering until the image of the primary pinhole 7 is coincident with the image of the secondary pinhole 25.

If the second reflecting mirror 27 is retracted from the optical path, the luminous flux from the relay lens 26 falls on a light receiver 32 to which is electrically connected an indicator 33 which makes it possible to measure the quantity of light impinged on the specimen 15.

In the above mentioned four operations according to the invention, use is made of the following optical elements. That is, 1. in case of observing the specimen 15, use is made of the optical elements 16, 17, 18, 19, 20, 23 and 24, 2. in case of observing the centered condition of the pinholes 7 and 25, use is made of the optical elements 16, 25, 26, 27, 28, 29, 22, 23 and 24, 3. in case of measuring the quantity of light impinged on the specimen 15, use is made of the optical elements 16, 25, 26, 32 and 33, and 4. in case of taking photograph, use is made of the optical elements 16, 17, 18, 19, 20, 21, 30 and 31.

The relay lens 26 serves to project the rear focus of the objective 16 upon the light receiving surface of the light receiver 32 with the result that there is no risk of the light receiver 32 being struggled by the configuration of the specimen 15. In the lens system present in the optical path between the objective 16 and the light receiver 32 during the photometric operation, the relay lens 26 only absorbs light so that there is substantially no loss in the quantity of light thereby improving the photometric accuracy.

During the specimen observing and photographing operations the presence of the reflecting mirror 18 or 27 prevents the light receiver 32 from being impinged by the light with the result that the life of the light receiver 32 becomes long.

In the microscopic spectrophotometric successive operations with the aid of the apparatus according to the invention, in the first place the auxiliary light source 10 is energized and then the semi-transparent prism 9, lens 17 and reflecting mirror 18 are inserted into the optical path to observe the phase contrast of the specimen 15. If it is desired to take photograph, the reflecting mirror 21 may be inserted into the optical path.

Secondly, the photometric light source 1 is energized and the primary pinhole 7 is adjusted until the primary pinhole 7 is coincident with the outer periphery of the minute portion of the specimen 15, thereby obtaining a spot illumination. The semi-transparent prism 9, lens 17 and reflecting mirror 18 are retracted from the optical path and the reflecting mirrors 27, 29 and 22 are inserted into the optical path to form the image of the primary pinhole 7 on the secondary pinhole 25 by means of the objective 16. Then, the objective 16 is adjusted to effect the centering of the pinholes.

The reflecting mirror 27 is retracted from the optical path after the correct centering of the pinholes has been performed to measure the quantity of light impinged on the specimen 15.

If it is desired to take photograph under the correct centered condition of the pinholes, the lens 17 and reflecting mirrors 18 and 21 are inserted into the optical path and the reflecting mirror 29 is retracted from the optical path. In this case the photographed portion substantially corresponds to that portion of the specimen 15 whose quantity of light has been measured.

As explained hereinbefore, the use of the optical system, that is, the reflecting mirrors 18, 21, 22, 27, 29, semi-transparent prism 9 and eventually lens 17 adapted to be inserted into and retracted from the optical path in accordance with the invention ensures interchange of the four operations of observing the specimen, centering the pinholes, measuring the quantity of light and of taking photograph in a positive and simple manner and further provides the important advantage that troublesome and time consuming interchange between the objective and the condenser lens can be avoided, and that microscopic spectrophotometer can reliably be operated, thereby improving the photometric accuracy.

In the above mentioned example use is made of the reflecting mirror 29 adapted to be inserted into and retracted from the optical path. The reflecting mirror 29 may be replaced by a stationary semi-transparent mirror since the reflecting mirror 29 is excluded out of the photometric optical axis. Moreover, instead of the two reflecting mirrors 21 and 22 use may be made of one reflecting mirror adapted to be rotated by 90° in dependence with the centering or photographing operation. However, it is preferable to use the two selectively displaceable reflecting mirrors 21 and 22 rather than one rotatable reflecting mirror which causes the click stop mechanism to decrease its accuracy.

What is claimed is:

1. A mirror drum optical system for use in a microscopic spetrophotometer comprising a photometric light source apparatus including a primary pinhole, a light source apparatus including a ring iris and illuminating the phase contrast, a specimen, a semi-transparent prism adapted to illuminate said specimen located on the same optical axis from said two light source apparatus, an objective and light receiver located on said optical axis, a first reflecting mirror adapted to be inserted into and retracted from said optical axis, a secondary pinhole, a first relay lens and a second reflecting mirror adapted to be inserted into and retracted from said optical axis, said mirrors and lens being arranged on said optical axis between said objective and light receiver, a phase plate, a second relay lens and eyepiece arranged in sequence on the optical axis bent by said first reflecting mirror, a phase plate projecting lens arranged between said objective and said phase plate, a third relay lens located on the optical axis bent by said second reflecting mirror, a third reflecting mirror adapted to be inserted into and retracted from the optical path or a stationary semi-transparent mirror for bending said optical axis including said third relay lens towards a direction extending in parallel with said optical axis from said objective to said light receiver and perpendicular to said optical axis bent by said first reflecting mirror, said optical axis bent by said third reflecting mirror or semi-transparent mirror being perpendicular to and crossed with said optical axis bent by said first reflecting mirror at the intermediate between said second relay lens and said eyepiece, a fourth reflecting mirror located at said crossed position and adapted to be inserted into and retracted from the optical path and to bend said optical axis bent by said first reflecting mirror towards said third reflecting mirror, a fifth reflecting mirror located at said crossed position and adapted to be inserted into and retracted from the optical path and to bend said optical axis bent by said third reflecting mirror or semi-transparent mirror towards said eyepiece, and a photographic eyepiece located on said optical axis bent by said fourth reflecting mirror and leading to a photographic film.

* * * * *